US006993869B2

(12) United States Patent
Waters (10) Patent No.: US 6,993,869 B2
(45) Date of Patent: Feb. 7, 2006

(54) STACKABLE PLANTING CONTAINERS WITH CAPILLARY WATERING

(76) Inventor: S. Collar Waters, 1320 Warwick Furnace Rd., Pottstown, PA (US) 19102

( * ) Notice: Subject to any disclaimer, the term of this patent is extended or adjusted under 35 U.S.C. 154(b) by 0 days.

(21) Appl. No.: 10/782,335

(22) Filed: Feb. 19, 2004

(65) Prior Publication Data

US 2005/0183334 A1    Aug. 25, 2005

(51) Int. Cl.
*A01G 9/02* (2006.01)
(52) U.S. Cl. .................. 47/83; 47/79; 47/81; 47/66.7; 47/65.5
(58) Field of Classification Search ............. 47/79–83, 47/65.5, 66.6, 66.7, 39, 71, 41.14, 41.01, 47/48.5, 59 R, 62 C, 62 E
See application file for complete search history.

(56) References Cited

U.S. PATENT DOCUMENTS

| 3,137,095 | A |   | 6/1964  | Pearson                      |
|-----------|---|---|---------|------------------------------|
| 3,293,798 | A |   | 12/1966 | Johnson, Sr.                 |
| 4,006,559 | A | * | 2/1977  | Carlyon, Jr. ........... 47/39 |
| D244,471  | S |   | 5/1977  | Cicci                        |
| 4,057,931 | A |   | 11/1977 | Stutelberg et al.            |
| 4,151,680 | A |   | 5/1979  | Sena                         |
| 4,185,414 | A | * | 1/1980  | Miller ................. 47/62 C |
| 4,245,433 | A | * | 1/1981  | Sjostedt et al. ......... 47/59 R |
| 4,250,665 | A |   | 2/1981  | English et al.               |
| 4,355,485 | A |   | 10/1982 | Frank                        |
| 4,404,767 | A |   | 9/1983  | Enrich                       |
| 4,736,543 | A |   | 4/1988  | von Bertrab Erdmann          |
| D295,842  | S |   | 5/1988  | Gay                          |
| 4,779,378 | A |   | 10/1988 | Mason, Jr.                   |
| 5,136,807 | A |   | 8/1992  | Orlov                        |
| 5,146,709 | A | * | 9/1992  | Iseki ................ 47/41.01 |
| 5,309,671 | A |   | 5/1994  | Byun                         |
| 5,404,672 | A |   | 4/1995  | Sanderson                    |
| 5,411,562 | A | * | 5/1995  | Saparzadeh ........... 47/58.1 R |
| 5,438,797 | A |   | 8/1995  | Lendel                       |
| 5,533,302 | A |   | 7/1996  | Lynch et al.                 |
| 5,546,700 | A | * | 8/1996  | Kumpf ................. 47/79 |
| 5,622,004 | A | * | 4/1997  | Gidge ................. 47/71 |
| 5,797,217 | A |   | 8/1998  | Magee                        |
| 5,956,899 | A | * | 9/1999  | DiOrio ................. 47/80 |
| 6,092,333 | A |   | 7/2000  | Steffan                      |

(Continued)

FOREIGN PATENT DOCUMENTS

EP     0291384     *   5/1987

(Continued)

OTHER PUBLICATIONS

Home Grown Vegetables Without a Garden: Copyright 2004 The EarthBox, Inc., 5 pages.

*Primary Examiner*—Peter M. Poon
*Assistant Examiner*—Andrea M. Valenti
(74) *Attorney, Agent, or Firm*—Davis & Bujold, P.L.L.C.

(57) ABSTRACT

A stackable unit for automatically dispensing fluid to at least one growing medium container associated with the stackable unit. The stackable unit comprising at least one growing medium container and a reservoir with an open top to facilitate filling thereof. A drainage channel cooperates with the reservoir and the drainage channel having an inlet located adjacent the open top of the reservoir to facilitate draining of excess fluid from the reservoir. The reservoir having at least one lateral dispensing opening for dispensing fluid from the reservoir into growing medium. A capillary member, which controls flow of fluid from the reservoir to the at least one growing medium container, communicates with the least one lateral dispensing opening supporting, for supplying moisture to growing medium to facilitate growing of a plant.

20 Claims, 6 Drawing Sheets

U.S. PATENT DOCUMENTS

| | | |
|---|---|---|
| 6,134,832 A | 10/2000 | Bokmiller et al. |
| 6,205,706 B1 * | 3/2001 | Buss .......................... 47/48.5 |
| 6,418,663 B1 * | 7/2002 | Smith ........................... 47/79 |
| 6,418,664 B1 * | 7/2002 | Shaw ........................... 47/79 |
| 6,470,625 B1 * | 10/2002 | Byun ........................... 47/82 |
| 6,536,160 B1 | 3/2003 | Morlier et al. |
| 6,612,073 B1 | 9/2003 | Powell et al. |
| 6,622,430 B1 * | 9/2003 | Lai .............................. 47/79 |
| 6,672,007 B1 * | 1/2004 | Lai .............................. 47/79 |
| 2002/0129551 A1 | 9/2002 | Kemp et al. |

FOREIGN PATENT DOCUMENTS

| | | | |
|---|---|---|---|
| FR | 2550073 A1 | * | 2/1985 |
| JP | 2003111529 A | * | 4/2003 |

* cited by examiner

STACKABLE PLANTING CONTAINERS WITH CAPILLARY WATERING

FIELD OF THE INVENTION

The present invention relates to decorative planting container which is stackable and has a capillary watering or fluid dispensing mechanism. The decorative planting container also includes an automated system which ensures that each reservoir, in a nested or stacked array, is completely filled to its maximum fluid containing capacity upon merely filling the top most reservoir.

BACKGROUND OF THE INVENTION

Container gardening or planting has been well known in the gardening arts for literally centuries, with surviving examples being known from, for example, the Roman, Greek and Sumerian periods. Stated simply, container gardening is the growing of plants in a body of soil contained in a container which may, for example, be pottery, terra cotta, cement, stone, wood, plastic, and so on and which may be located either indoors or outdoors. The sole requirements are that the containers be capable of containing and supporting the soil or other growing medium and that the containers be capable of retaining the desired degree or content of moisture for a sufficient period, which will depend on the requirements of the plants growing within the container and the growing environment and conditions.

Container gardening is advantageous in may instances because it allows more control over the growing process and, for example, allows plants to be grown in circumstances, such as indoors or on patios or in other places where in-ground methods are not practical or convenient, and allows a more efficient use of the available space because the containers can often be stacked vertically one on top of the other.

A recurring problem in container gardening, however, is watering the plants in order to maintain the necessary or desired degree of moisture in the growing medium which may be, for example, soil, a man-made medium or a mixture or combination thereof. That is, the volume of growing medium in a container is much smaller, on a per plant basis, than when the plant is grown in the ground so that the plant will generally consume the moisture in the growing medium at a much faster rate than the same plant would if planted in the ground. In addition, a container, particularly one in a stacked or a nested array of containers, is less efficient at capturing moisture, e.g., rain or water from a water pail or garden hose, than is the ground. Also, the moisture will often escape from the growing medium within a container at a much faster rate than the moisture will from the ground because of the proportionally much greater ratio of exposed surface area to volume of the growing medium in a container as compared to, for example, the soil in a field or a planting bed.

While there are methods addressing at least some of these problems, they have generally proven unsatisfactory. For example, the loss of moisture from a container through the container sides or bottom may be reduced by making the container waterproof. This solution for moisture retention, however, introduces or greatly increases an excessive amount of water in the growing medium and possible "drowning" and/or rotting of the root system of the plant.

Yet another approach to certain of the problems associated with container gardening is various forms of an automatic watering system or mechanism. Such systems or mechanisms may include, for example, various irrigation systems with various forms of piping and timer controlled valves connected to a water source, or valves controlled by one or more electrical moisture sensors. Such systems or mechanisms, however, are generally expensive and prone to failure and often require a separate sub-system for each container layer when the containers are stacked because of the well known tendency for water or other liquids to flow or migrate downhill, due to gravity, often to a location or area where the water or liquid is not wanted or required.

One variation on the known watering method employs one or more water conductive elements, such as capillary tubing or material having capillary properties. The capillary tubing or material draws water from a reservoir and delivers the water to the desired location in the growing medium. This method provides a solution to some of the above discussed problems in that these methods deliver the water generally on demand and when needed and do not require any moving parts, such as electrical power or sensors. That is, typically one end of the capillary element is embedded in the growing medium at a desired watering point or location while the opposite end the capillary element is placed in a source of water. Then, the capillary element will "sense" the difference kin moisture, between the growing medium and the water source, and when the growing medium becomes too dry, will "draw" or "pump" water from the water source to the growing medium, via capillary action of the capillary element, at a rate determined by the relative moisture differential across the capillary element.

The capillary method of watering various growing mediums in various circumstances has been so successful that it is often used to irrigate fields and planting beds and to control the delivery of moisture to seed germination beds, as well as to irrigate plants in growing containers. Notwithstanding these improvements, even the currently known capillary systems present problems in certain circumstances. For example, when a plurality of containers are stacked vertically, it is generally necessary to provide a separate reservoir and capillary system for each stacked layer and to isolate effectively each stack layer from the other stacked layers, whether or not each layer is constructed as a separate container unit or constructed as a single, integral unit. Again, this problem arises because of the tendency of water to flow downhill, due to gravity, which could otherwise result in the water in the upper layers, containers, reservoirs and capillary systems leaking or flowing downward into the lower layers, containers, reservoirs and capillary systems with a resulting lack of moisture for the upper stacked layers, containers, reservoirs and capillary systems and excess water, and possibly an overflow of water, in the lower stacked layers, containers, reservoirs and capillary systems.

The construction of each container layer, as a separate isolated and self-contained unit, also introduces additional problems. For example, the typical need to provide a separate reservoir and capillary system for each stack layer and to effectively isolate each stack lever from lower stack layer increases the complexity, weight and cost of the stackable containers. In addition, and as part of the added complexity, it is typically necessary to provide a separate access to an associated reservoir for each layer of a stacked array of containers due to a number of reasons. For example, the reservoirs are typically isolated from one another to avoid unwanted leaks and overflow when filling, which automatically results in a requirement for some form of a separate access to each reservoir. This requirement, in turn, imposes notable constraints on the design of the container layers, which typically includes an inconvenience in accessing each reservoir and difficulty in seeing the current water level of each reservoir which, in turn, may result in either under filling of a reservoir, and thus insufficient watering, or overfilling of a reservoir with a consequent mess or problem associated with water overflowing from or leaking out of the portable planting system.

SUMMARY OF THE INVENTION

Wherefore, it is an object of the present invention to overcome the above mentioned shortcomings and drawbacks associated with the prior art.

An object of the present invention is to provide a stackable unit capable of forming a nested array of units which facilitates filling of each one of the reservoirs, within the nested array of stackable units, by merely filling the reservoir of the top most unit.

Another object of the present invention is to provide at least one capillary member to facilitate transfer of the fluid from the reservoir into the growth medium, carried by the growth medium container and associated with each reservoir, to maintain the growth medium at a desired moisture content and facilitate growing of one or more desired plants therein.

Still another object of the present invention is to locate the reservoir at substantially the same vertical height as the growth medium carried by the growth medium container, to facilitate expedited transfer of the fluid substantially horizontal and radially from the reservoir into the growth medium via capillary action.

A still further object of the present invention is to insure that the reservoirs of each stackable unit, forming a nested array, is completely filled with water or liquid upon filling merely the top most reservoir of the nested array.

The present invention also relates to a stackable unit for automatically dispensing fluid to at least one growing medium container associated with the stackable unit, the stackable unit comprising: at least one growing medium container; a reservoir having an open top to facilitate filling thereof; a drainage channel communicating with the reservoir, and the drainage channel having an inlet located adjacent the open top of the reservoir to facilitate draining of excess fluid from the reservoir; the reservoir having at least one lateral dispensing opening for dispensing fluid from the reservoir into growing medium, when accommodated by the at least one growing medium container of the stackable unit; and the least one lateral dispensing opening supporting a capillary member which controls flow of fluid from the reservoir to the at least one growing medium container, for providing moisture to thereto to facilitate growing of a plant.

The present invention also relates to a method of forming a nested array of a plurality of stackable units for automatically dispensing fluid to at least one growing medium container associated with the stackable unit, each stackable unit of the nested array comprising: at least one growing medium container; a reservoir having an open top to facilitate filling thereof; a drainage channel communicating with the reservoir, and the drainage channel having an inlet located adjacent the open top of the reservoir to facilitate draining of excess fluid from the reservoir; the reservoir having at least one lateral dispensing opening for dispensing fluid from the reservoir into growing medium, when accommodated by the at least one growing medium container of the stackable unit; and the least one lateral dispensing opening supporting a capillary member which controls flow of fluid from the reservoir to the at least one growing medium container, for providing moisture to thereto to facilitate growing of a plant; stacking the plurality of stackable units one on top of the other to form the nested array; filling the reservoir of each of the plurality of stackable units in the nested array, by merely filling a top most reservoir, and allowing fluid to overflow from each reservoir into the drainage channel until each reservoir is filled.

BRIEF DESCRIPTION OF THE DRAWINGS

The invention will now be described, by way of example, with reference to the accompanying drawings in which.

DETAILED DESCRIPTION OF THE INVENTION

Figure 1:
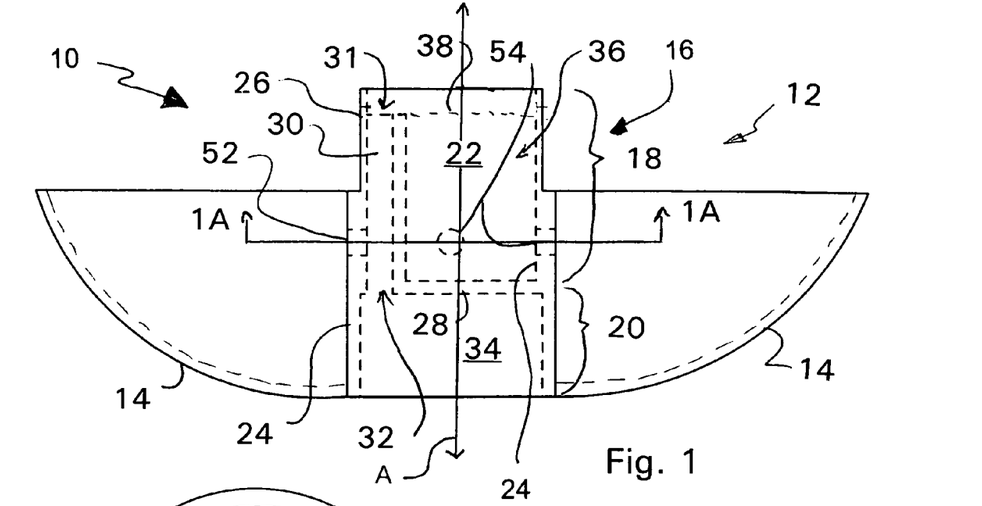
FIG. 1 is a diagrammatic side elevational view of an exemplary stackable container unit including a fluid reservoir and two associated growing medium containers.
Figure 2:
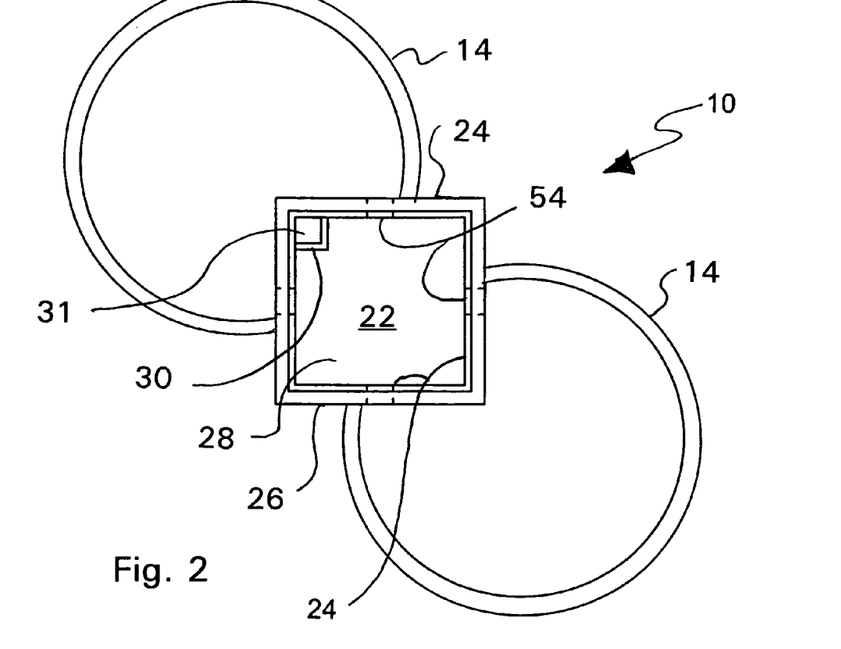
FIG. 2 is a diagrammatic top plan view of the stackable container unit of FIG. 1.
Figure 3:
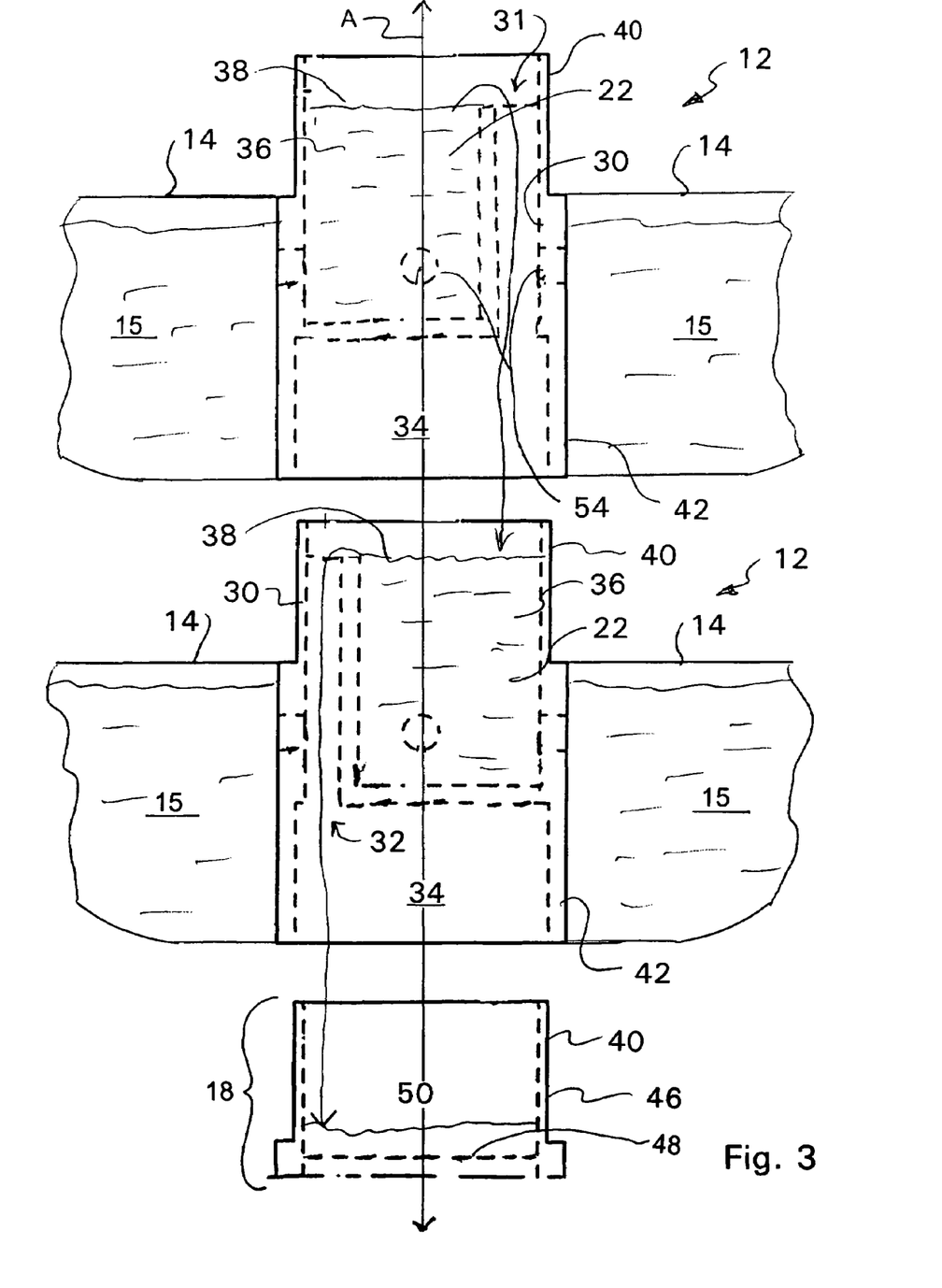
FIG. 3 is a diagrammatic side sectional partial view showing stacking of two stackable units with a base unit.

Referring first to FIGS. 1 and 2, therein are respectively shown a diagrammatic side sectional view and a diagrammatic top plan view of an exemplary stackable container structure 10. In FIG. 3, a diagrammatic side sectional view showing stacking of a plurality of reservoir structures, e.g., two stackable units 12 on a base unit can be seen. Each stackable unit 12, in turn, includes or supports at least one and, as shown in these Figs., a pair of opposed integral growing medium containers 14 which are normally filled, during use, with a conventional growth medium 15.

As shown therein, each stackable unit 12 includes a centrally located reservoir structure 16 having an upper section 18 and a vertically adjacent and concentric lower section 20 (see FIG. 1) that together form a watertight unit. As noted above, a plurality of growing medium containers 14, generally two, three, four or possibly more growing medium containers 14 are symmetrically arranged radially, formed with or attached to and communicating with the central reservoir structure 16. As such, and for example, upper section 18 and lower section 20 may be formed as separate units that are attached, welded or mated with one another to form a single unit or these two sections may be formed or molder integrally with one another as a single unitary integral unit.

Figure 4:
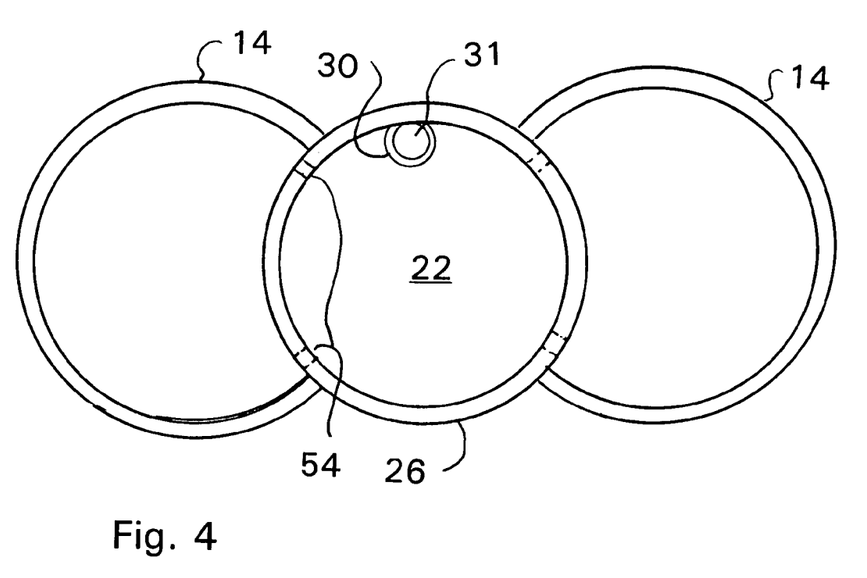
FIG. 4 is a diagrammatic top plan view of a second embodiment of the stackable unit.
Figure 5:
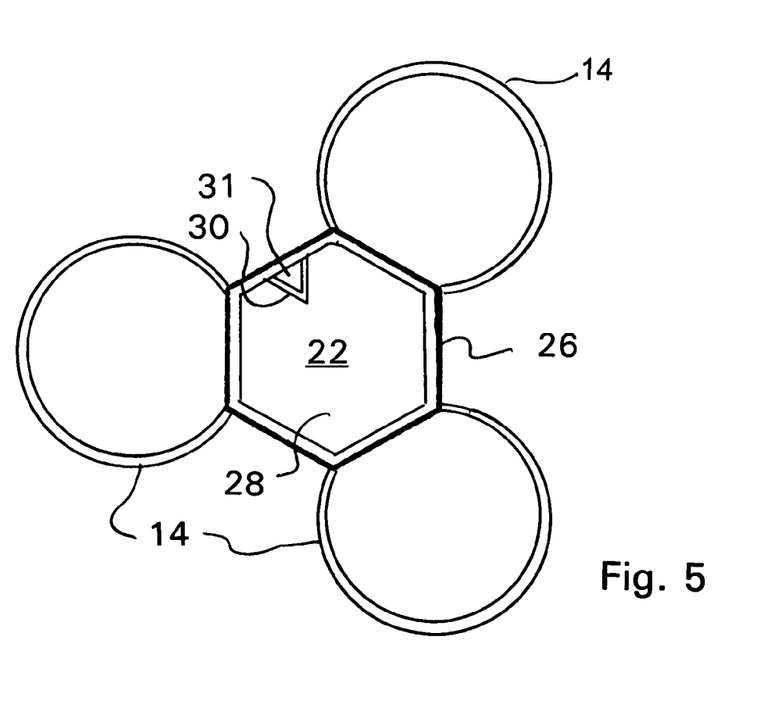
FIG. 5 is a diagrammatic top plan view of a third embodiment of the stackable unit.

As illustrated, the upper section 18 includes and defines an internal or central reservoir 22 having an open top to facilitate filling of the reservoir 22, one or more vertical surfaces 24 together forming a side wall 26, as illustrated in FIGS. 1 and 2, or a single vertically surface or wall 26 comprising, for example, of a cylindrical wall, as illustrated in FIG. 4. It is to be appreciated that the transverse cross sectional shape of the reservoir 22 can have a variety of different shapes and sizes and may be, for example, hexagonal, triangular, rectangular, octagonal, etc. The reservoir 22 further includes a horizontal bottom wall 28 located approximately at the interface or transition between upper section 18 and lower section 20. The reservoir 22 is sized to hold a desired quantity or volume of fluid such as water or some other liquid. Preferably, the reservoir 22 has a fluid capacity of between 5 and 200 fluid ounces, more preferably the reservoir 22 has a capacity of between 25 and 140 fluid ounces, and most preferably the reservoir 22 has a capacity of between 40 and 80 fluid ounces.

The reservoir 22 further includes an overflow or drainage channel 30 having a drainage inlet 31 located near but slightly vertically below, e.g., between about 0.125 to about 2 inches or so, the upper most circumferential edge of reservoir 22. The drainage channel 32 extends vertically downward through the reservoir 22, generally along the side wall 26 thereof, and a drainage outlet 32 of the drainage channel 30 is locate adjacent the bottom wall 28 of the reservoir 22. It will, therefore, be seen that drainage channel 30 forms an overflow and drainage passageway extending from near the top of reservoir 22 downward through the reservoir 22 and into the lower chamber 34 of the lower section 20 of the stackable unit 12 for transmission of fluid thereto. The stackable unit 12 has a central axis A which extends therethrough and the drainage channel 30 extends substantially parallel to the central axis A but is space radially therefrom.

If desired, the bottom surface of each one of the growth medium containers 14 can be provided with one or more apertures (not shown) which facilitates drainage of any excess water or moisture which accumulates within the container due to rain, for example. If this accumulated water is allowed to collect and remain at the base of the growth medium container 14 for a prolong period of time, especially if the stackable unit 12 is manufactured from a plastic material or some other waterproof material, this water may cause damage to the root system of any plant growing therein.

As fluid 36 is poured into or otherwise flows or enters the reservoir 22 of a stackable unit 12, the fluid will normally commence accumulating in the reservoir 22 until the level 38 of the fluid 36 reaches the inlet 31 of the drainage channel 30 (see FIG. 3). Once the level 38 of the fluid surpasses this height, the fluid will then flow into the inlet 31 of drainage channel 30, so that all additional fluid, in excess of the design capacity of the reservoir 22, will exit the reservoir 22, via drainage channel 30, and be channeled into lower chamber 34 of the stackable unit 12 for conveyance to a next lowest reservoir 22 in a nested array of stackable units 12, a base unit 46, the ground or other support surface. As a result of this design, each reservoir 22 is automatically filled to the proper level, i.e., its maximum capacity which is the level just prior to fluid 36 being able to flow into the inlet 31 of the drainage channel 30. The maximum capacity of the reservoir 22 will therefore be fixed by the volume defined by the horizontal area of the reservoir 22, exclusive of the area of drainage channel 30, multiplied by the vertical height from bottom the wall 28 of the reservoir 22 to the top edge of the drainage channel 30, as is well known in the art. The volume of fluid 36 accommodated by the reservoir 22 will, therefore, be known once the reservoir 22 is filled and any excess fluid allowed to flow into inlet 31 and reduce the fluid volume within the reservoir 22 to its maximum capacity or volume, i.e., the volume when the fluid no longer flows into inlet 31.

According to the present invention as illustrated in FIG. 3, and as discussed further below, the stacking of a plurality of similar or like stackable units 12, one on top or below the other, will result in a nested array of stackable units 12 with the lower chamber 34 of an upper stackable unit 12 conjoining, e.g., fitting over and receiving the leading perimeter top edge of the upper section 18 of an adjacent vertically lower reservoir 22 of a lower stackable unit 12. In the exemplary embodiment shown in FIG. 3, for example, the interior of each lower chamber 34, which is formed in the lower section 20 of each stackable unit 12, is shaped and dimensioned to fit over and closely encompass and receive the upper portion of the upper section 18 of the lower adjacent stackable unit 12 to formed an interlocking arrangement of stacked units. Stated the other way, the side wall 26 of the upper section 18 of each stackable unit 12 comprises or forms a male component 40 which will fit into a sightly larger mating female component 42 formed by the side wall 26 of the lower chamber 34 of an adjacent upper stackable unit 12. It is to be appreciated by those skilled in the that there are a variety of other ways for achieving interlocking of the stackable units 12 with one another for forming a nested array of stackable units 12 and such variety of other ways are not discussed further but all are considered to be within the spirit and scope of the present invention.

When two stackable unit 12 are stacked with one another to form a nested array of stackable units 12, in the manner depicted in FIG. 3, the lower chamber 34 of the upper most stackable unit 12 forms a cover for the reservoir 22 for the adjacent lower stackable unit 12. As a further result, therefore, any overflowing fluid 36 spilling from the reservoir 22 of an adjacent upper stackable unit 12 will flow through the drainage channel 30 of the adjacent upper stackable unit 12 and into the reservoir 22 of a next lower adjacent stackable unit 12. The cover formed by the lower chamber 34 of the adjacent upper stackable unit 12 will prevent any overflowing fluid from spilling over the side wall 26 of the reservoir 22.

When two or more stackable units 12 are stacked with one another to form a nested array, it will be apparent that once the level of fluid 36 in a reservoir 22 of an adjacent upper stackable unit 12 is filled to its maximum capacity, the overflow of fluid 36 from the reservoir 22 of the upper most stackable unit 12 will flow through the associated drainage channel 30 and into the reservoir 22 of the immediately adjacent next upper most stackable unit 12. If a plurality of stackable units 12 are sequentially vertically stacked, one on top of the other, the subsequent filling and over flowing will continue until each subsequent reservoir 22, in the nested array of stackable units 12, is completely filled to its maximum capacity. Completion of the filling process will be signified when the reservoir 22 of the lower most stackable unit 12 commences over overflowing fluid, via its drainage channel 30, into a support plate or some other collection chamber or onto the floor, ground or some other supporting surface. Once this occurs, the person filling the reservoirs 22 is certain that each one of the reservoirs 22, in the nested array of stackable units 12, is properly filled to its maximum capacity or volume. That is, each reservoir 22 is filled with the same volume or amount of fluid 36.

It will be noted that the structure and operation of stackable units 12 is advantageous and solves certain problems of the prior art. For example, the only access required in order to fill all of the stacked reservoirs 22 is access to the top most reservoir 22, regardless of how many stackable units 12 are arranged, nested or stacked one on top of the other. In addition, the system of the present invention ensures that each reservoir 22 is automatically filled with a predetermined volume of fluid 36, and that none of the reservoirs 22 will be overfilled since any excess fluid, supplied to any reservoir 22, will automatically overflow into the drainage channel 30 and discharge into a next lower adjacent reservoir 22, and so forth, and finally into a support plate or some other collection chamber or onto the floor, ground or some other supporting surface. Once the level 38 of fluid 36 is able to flow into the inlet 31 of the associated drainage channel 30, any additional fluid is only able to temporarily collect or accumulate within the reservoir 22.

The stackable units 12 of the present invention also automatically indicate once all of the reservoirs 22 of an array of stackable units 12 are completely filled to maximum capacity upon fluid discharging from the reservoir 22 of the lower most stackable unit 12 of the stacked array. If overflow of the fluid 36 onto the ground, floor or support surfaces presents a problem, e.g., the nested array of stackable units 12 is located indoors, the base unit 46 may be utilized and it is equipped with an overflow collection chamber 50 therein to collect fluid as it overflows from the reservoir 22 of the adjacent lower most stackable unit 12. The base unit 46 may be equipped with a vertical sight window or some other water level indicator to indicate as soon as fluid commences accumulating within the overflow collection chamber 50 of the base unit. Once fluid is detected as accumulating within the reservoir 22 of the base unit, the filling process is discontinued.

Now considering other aspects of the structure and operation of the stackable unit 12, it should be noted that the drainage channels 30 of successively stacked stackable units 12 preferably are not vertically aligned with other another. When successively stacking the stackable units 12 to form a nested array of stackable units 12, the immediately adjacent upper and lower drainage channels 30 are staggered or offset from one another so that as filling fluid overflows from the immediately adjacent upper drainage channel 30, this fluid flow will be directed into the reservoir 22 of the adjacent next lowest stackable unit 12 (see FIG. 3) and not directly into the drainage channel 30 of the adjacent next lowest stackable unit 12. This staggered or offset arrangement of the immediately adjacent drainage channels 30 ensures that the overflow fluid 36 will flow directly into the reservoir 22 of the adjacent next lowest stackable unit 12 and not directly into the drainage channel 30 of the adjacent next lowest stackable unit 12.

To assist with staggering or offsetting the drainage channels 30 from one another, the system of the present invention preferably includes a registering or indexing feature which avoids accidental alignment of the drainage channels 30 of vertically stacked, immediately adjacent stackable units 12 with one another or to otherwise prevent the overflow of fluid from an immediately adjacent upper drainage channel 30 directly into an immediately adjacent lower drainage channel 30. For example, and referring to the exemplary implementation illustrated in FIGS. 1, 2 and 3, the stackable units 12 are indexed by the transverse cross sectional shapes of the reservoir structures of the stackable units 12 and by the locations of the growing medium containers 14. That is, the transverse cross sectional shapes of the reservoir structures 16, which are squares, assist with nesting of the stackable units 12 at a 90 degree orientation with respect to one another. At the same time, the locations of the growing medium containers 14, located at diametrically opposite corners of the squares, also tend to facilitate stacking adjacent stackable units 12 such that they are rotated 90 degree with respect the immediately adjacent higher or lower stackable units 12. In most applications, it would generally be undesirable to position one growing medium container 14 immediately above or beneath another growing medium container as this would impede or hinder plant growth.

It is to be appreciated that the transverse cross sectional shape of the reservoir structure may include, for example, triangles, pentagrams, hexagons and octagons, and so on, with the same or similar results. It is generally preferably, however, to have structures with the growing medium containers 14 evenly or symmetrically distributed about the central axis A of the stackable unit 12, and thus symmetrically about the reservoir 22 and thereby to avoid construction of a stackable unit 12 that is severely unbalanced.

In other implementations, the desired indexing or orientation of the stackable units 12 may be achieved by other indexing mechanisms. For example, the reservoir structures 16 of the stackable units 12 may be cylindrical, as diagrammatically shown in FIG. 4, and the male and female flanges 40 and 42 may have mating or corresponding indexing fingers, notches, slots, tabs, grooves, recesses, etc., so that the stackable units 12 will only properly stack with one another once a predetermined orientation or alignment, between the two vertically adjacent stackable units 12, is achieved. As such teaching is well known in the art, a further discussion concerning the same is not provided.

Figure 8:
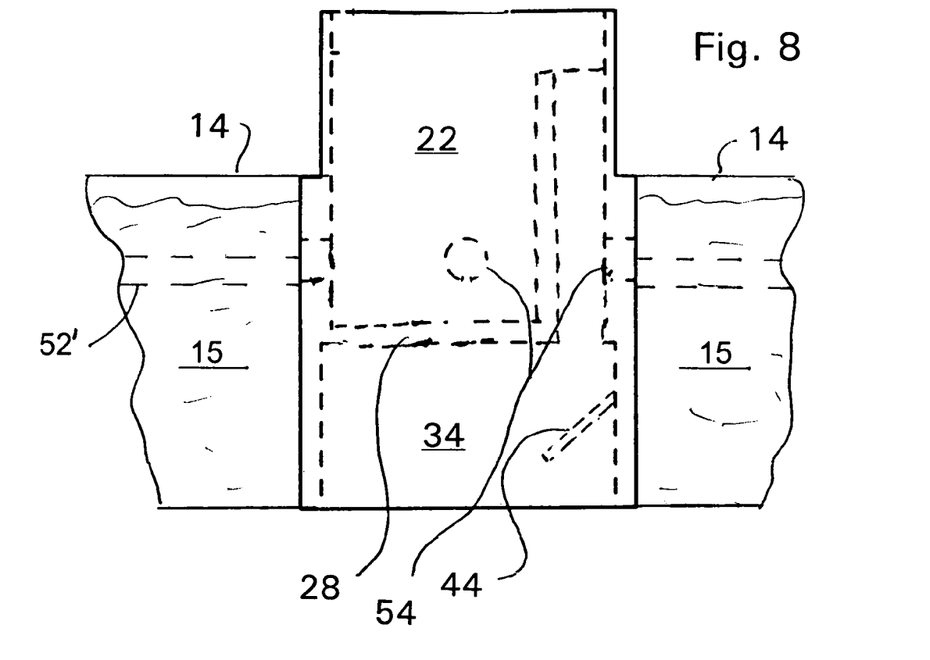
FIG. 8 is a diagrammatic side cross sectional partial view showing the deflector plate in the lower section for diverting overflow fluid from the drainage channel.
Figure 9:
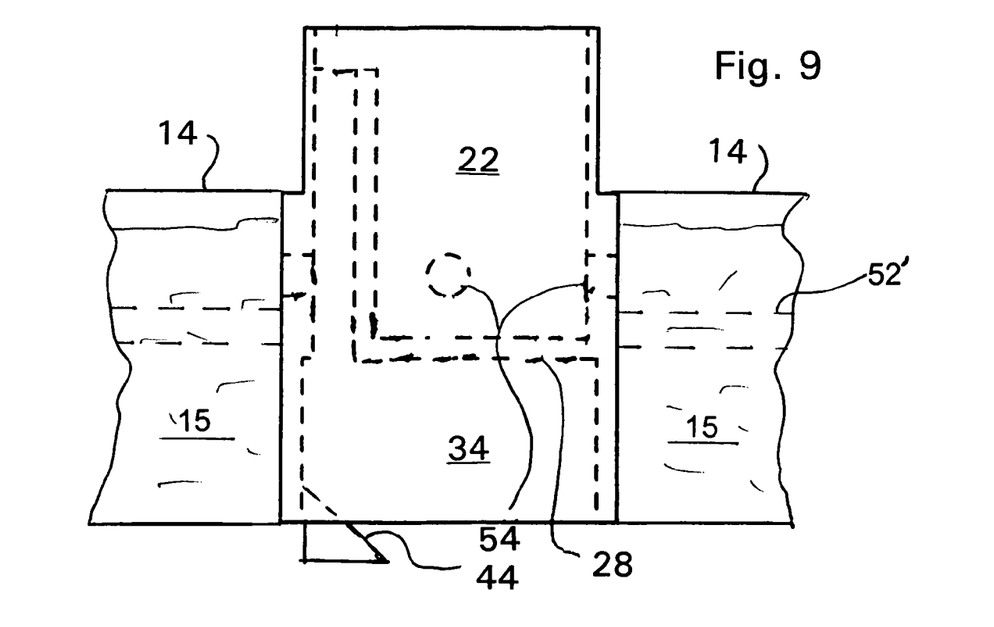
FIG. 9 is a diagrammatic side cross sectional partial view showing the deflector plate in the lower section for both assisting with assembly and diverting overflow fluid from the drainage channel.
Figure 10:
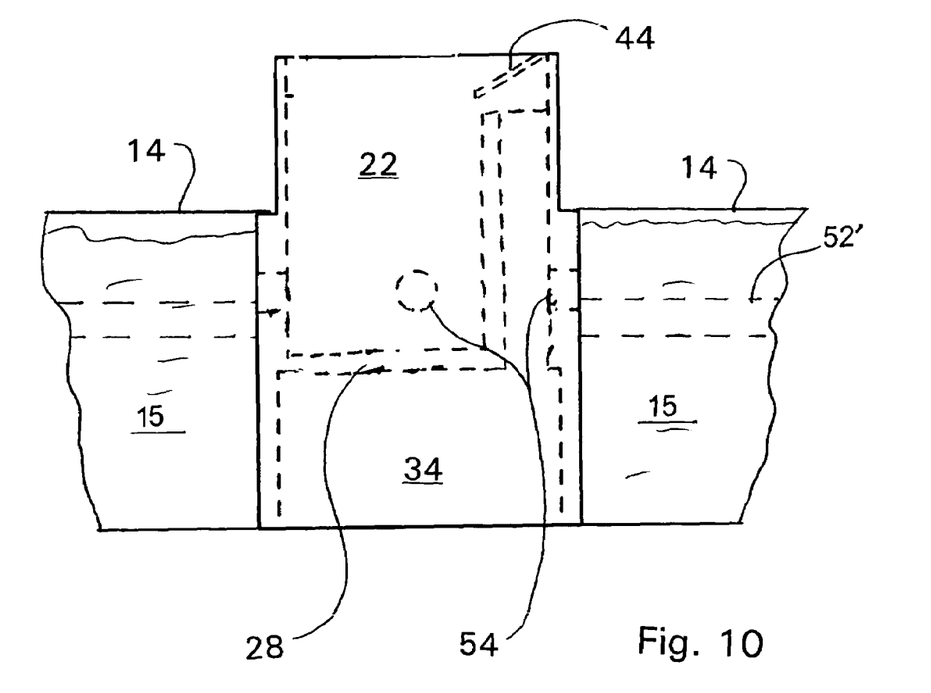
FIG. 10 is a diagrammatic side cross sectional partial view showing the deflector plate in the upper section for diverting overflow fluid from the drainage channel of another stackable unit.

In yet other implementations (see FIGS. 8–10), a deflection plate 44 may be formed or mounted on the inner wall of each lower chamber 34 at a location directly below the drainage outlet 32 of drainage channel 30 to direct the drainage fluid radially inward toward the central region of the reservoir 22 of an immediately adjacent lower stacked unit 12. The deflection plate 44 may be at a height which will interfere with the upper leading end of the drainage channel 30 of a next lower stackable unit 12 (see FIG. 9), if the stackable units 12 are stacked with drainage channels 30 aligned with one another, but not interfere if the two immediately adjacent stackable units 12 are orientated at 90 degrees relative to one another.

Alternatively, (see FIG. 8) the deflection plate 44 may be located so as not to interfere with the upper leading end of the drainage channel 30 of an immediately adjacent lower stackable unit 12 but merely divert or redirect all of the overflow fluid 36 from the drainage channel 30 toward the central region of the reservoir 22 of the next lowest stackable unit 12 and thereby prevent the fluid 36 from directly flowing into the drainage channel 30 of the immediately adjacent lower stackable unit 12.

In yet another embodiment (see FIG. 10), however, the deflection plate 44 may be formed as a cap or shield over the upper end of the drainage channel 30 to prevent fluid 36, from an immediately adjacent upper drainage channel 30, from flowing directly down into the immediately adjacent lower drainage channel 30, thereby allowing the stackable units 12 to be stacked, if desired, with the drainage channels 30 of immediately adjacent stackable units 12 aligned with one another.

It should also be noted that according to a preferred embodiment, the drainage channel 30 is located off-center with respect to the central axis A of the reservoir structure 16 to further minimize the possibility of vertical alignment of the drainage channels 30 with one another. For example, in the illustrative example shown in FIGS. 1, 2 and 3, the drainage channels 30 are located near a side wall 26 of the reservoir 22 and are, in fact, located in a corner of the structure 16 which is generally square in transverse cross section. It will also be noted that, although not critical with respect to avoiding alignment of the drainage channels 30, the drainage channels 30 are typically located in and extend along one of the corners of the square reservoir 22. It is to be appreciated that the overall shape or configuration of the drainage channel 30 is not critical, e.g., the channel may be, for example, square, tubular, triangular, oval, hexagonal, etc., in shape, as long as the minimum cross sectional area of the drainage channel 30 is adequate to drain and convey the excess fluid 36 from the reservoir 22 to the immediately adjacent next lower most reservoir 22, and so forth, without allowing excess fluid 36 to collect and accumulate within the reservoir 22 and overflow the side wall 26 of the reservoir 22 during the filling process. Stated another way, the shape of drainage channels 30 may be chosen on the basis of manufacturing convenience and cost or according to appearance as long as each drainage channel 30 provides an adequate overflow capacity.

Next considering the problem of the lowest reservoir 22 and drainage channel 30 of the bottom stackable unit 12 in a stack of stackable units 12, it will be apparent that the bottom stackable unit 12 will not have a lower reservoir 22 of a next lower stackable unit 12 to capture the fluid overflow from the drainage channel 30 of the lower most stackable unit 12. For this reason, and in a preferred form of the invention, a nested array of stackable units 12 further include the base unit 46 for closing and sealing the bottom of the lowest stackable unit 12, whether the lowest stackable unit 12 is a single unit or is part of a nested array of two or more stackable units 12.

As illustrated in FIG. 3, the base closure unit 46 essentially comprises (1) the upper section 18 of a reservoir structure 16 without: (1) a lower section 20, (2) any growing medium containers 14 or (3) a drainage channel 30, but includes the addition of a floor 48 to close off the bottom and thereby form the overflow chamber 50 to capture and retain any overflowing fluid from the adjacent lower most stackable unit 12. In this regard, it should be noted that the male component 40 formed in the upper part of the upper section 18 of the base unit 46 will, as with the stackable units 12, form a water-tight seal with the female component 42 of the adjacent next lowest stackable unit 12, thereby preventing the escape of fluid. If desired, an O-ring or gasket may be utilized at the interface between these two components, as well as the male component 40 and the female component 42 of any adjacent stackable units 12, to insure a water-tight seal therebetween. Alternatively, the base unit 46 may be positively engaged with the adjacent stackable unit 12 by means of a threaded joint or a bayonet-type engagement.

The stackable units 12 of the present invention further include means for dispensing fluid 36 from each reservoir 22 into the one or more growing medium containers 14 associated with each one of the reservoir 22 and finally to the growing medium and plants accommodated therein. The flow of fluid 36 from the reservoir 22 to the growing medium and/or the plants located within the associated growing medium container(s) 14 is controllably conducted by way of one or more capillary members, which may be formed in any conventional manner, as is well known in the arts.

Figure 1A:
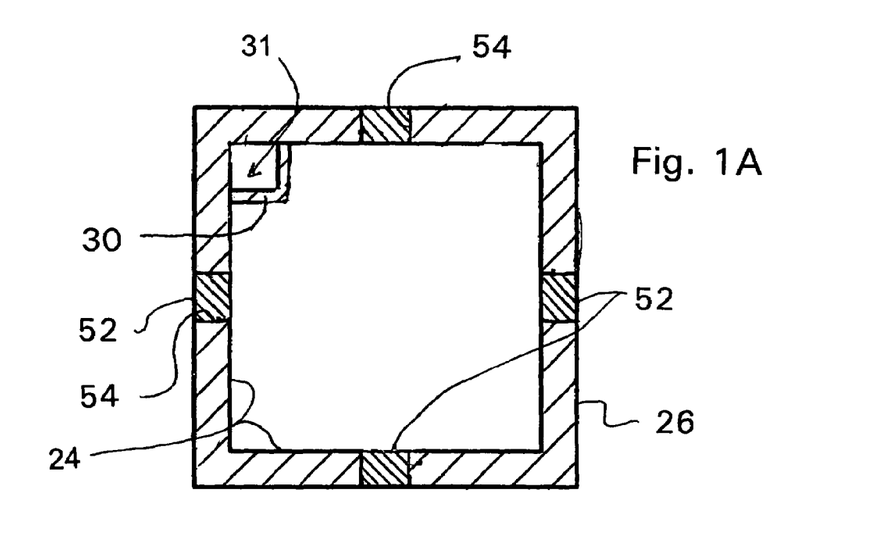
FIG. 1A is a diagrammatic side cross sectional view along section line 1A—1A of FIG. 1.

As shown in FIGS. 1 and 2, each reservoir 22 includes one or more fluid dispensing openings 54, at least one but preferably two or more dispensing openings 54 facing and communicating with each one of the associated growing medium containers 14. Each dispensing openings 54 will generally be formed in the lower most region of the reservoir 22 so that virtually all of the fluid in the reservoir 22 is able to flow out through one of the dispensing openings 54 into the growing medium, contained within the associated growing medium containers 14, so that substantially the entire volume of fluid within the reservoir 22 is distributed and utilized. A capillary member, such as a capillary plug 52 (see FIG. 1A), fills and seals each one of the dispensing openings 54 and the capillary plug 52 regulates the flow of fluid, via capillary action, from the reservoir 22 into the growing medium contained within the associated growing medium containers 14.

Figure 6:
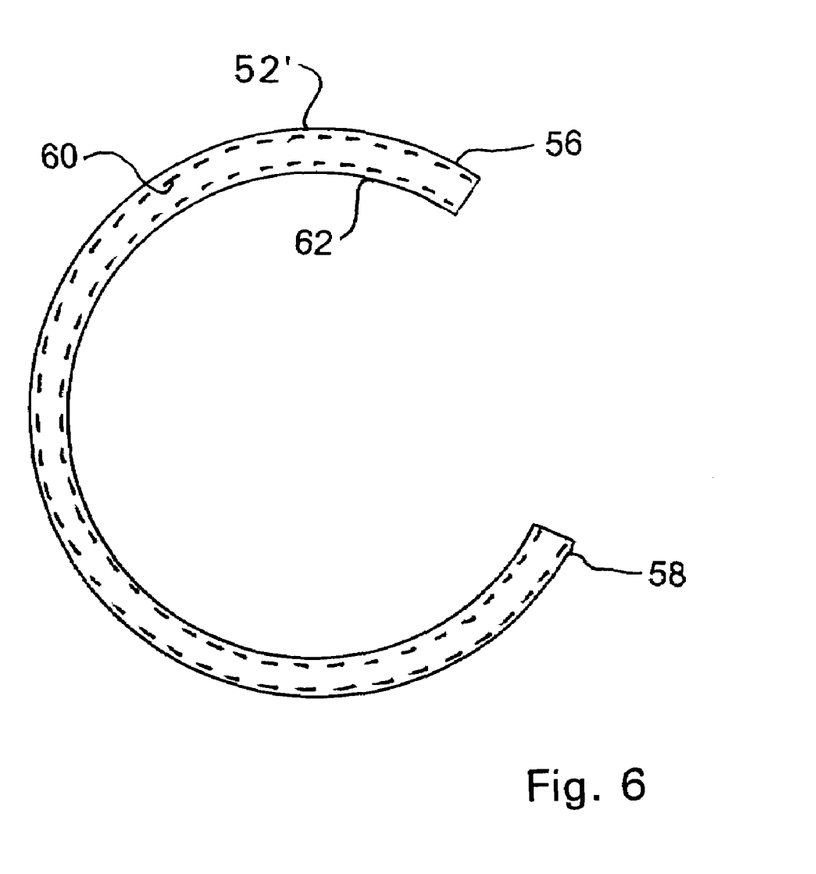
FIG. 6 is a diagrammatic plan view of one embodiment of the capillary tube.

Alternatively, a C-shaped capillary conduit 52' may be employed instead of a capillary plug 52 (see FIG. 6). That is, a first end 56 of the capillary conduit 52' is received within and seals a first one of the dispensing openings 54 while a second end 58 of the capillary conduit 52' is received within and seals a second dispensing opening 54. The fluid 36 within the reservoir 22 is allowed to flow along a dispensing passageway 60 formed within the capillary conduit 52' and then radially out through the permeable side wall 62 of the capillary conduit 52', via capillary action, into the growing medium contained within the associated growing medium containers 14. The capillary conduit 52' generally provides better distribution of the water or fluid to the growing medium contained within the associated growing medium containers 14.

Figure 7:
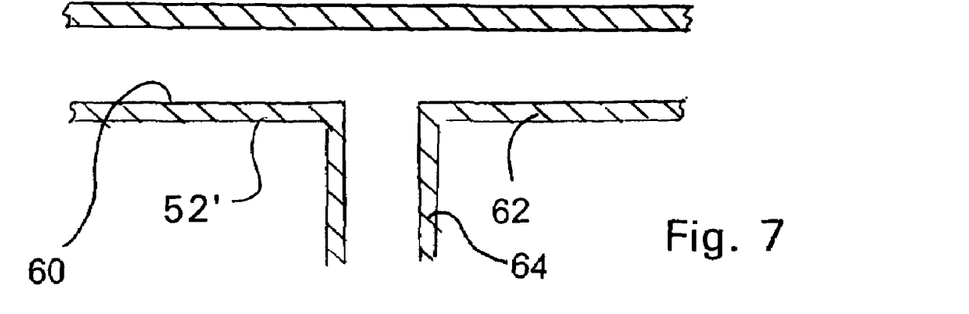
FIG. 7 is a diagrammatic side cross sectional partial view of showing a capillary tube with a capillary finger.

It will be appreciated that the capillary conduit 52' may have a variety different shapes or configurations depending upon the overall shape, size, volume, height, etc., of the associated growing medium containers 14. For example, the capillary conduit 52' may be generally circular in shape and spaced slightly radially inward of an outer circumference of the associated growing medium container, i.e., it has a smaller radius than the associated growing medium containers 14. In addition, the capillary conduit 52' may have one or more capillary fingers 64 which extend either radially inward or outward or possibly vertically downward further into the growing medium 15 to further assist with distribution of the water or fluid 36 deeper into the growing medium 15 contained within the associated growing medium containers 14. The water or fluid 36 flows substantially horizontal and radially away from the reservoir 22 into the growing medium accommodated within the associated growing medium containers 14. This results in a more compact arrangement for the nested array.

Due to capillary action, the capillary plug 52 and/or the capillary conduit 52' are able to continuously withdraw water or fluid 36 from the reservoir 22 and distribute the withdrawn water or fluid to the growing medium 15 contained within the growing medium container 14, as required. As used in the appended claims, the term capillary member is intended to include a capillary plug, a capillary conduit or tube, or any other component or element which facilitates distribution of the fluid from the reservoir to the growing medium as required by the growing medium.

One suitable capillary member is manufactured from non-woven polyester material, or some other similar material. In addition, the capillary member has a wall thickness of between 0.625 and 0.5 of an inch and more preferably the capillary member has a wall thickness of about 0.375 of an inch. Preferably the capillary member 52, 52' is snugly received within the dispensing opening 54 so as to minimize any leakage between the exterior surface of the capillary member 52, 52' and the inwardly facing surface of the dispensing opening 54 so that all fluid is dispensed via the capillary member 52, 52' and not by leakage between those two components.

The growth medium container 14 is sized to accommodate a volume of growth medium ranging between 500 and 5000 cubic inches, more preferably between and 1000 and 3250 cubic inches.

The capillary member preferably has an adequate fluid transfer rate such that the growth medium is maintained sufficiently saturated. The actual transfer rate for the capillary member will depend upon a number of factors including, for example, the dryness of the growth medium, the exposed moisture transmitting surface area of the capillary member, the internal moisture transmission characteristics of the capillary member, etc. The capillary member is selected so as the provide an adequate transmission of moisture to the growth medium to facilitate adequate watering of any plants growing therein.

Since certain changes may be made in the above described improved stackable unit for dispensing fluid without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A stackable unit for automatically dispensing fluid to at least one growing medium container associated with the stackable unit, the stackable unit comprising:
    at least one growing medium container;
    a reservoir having an open top to facilitate filling thereof and a bottom wall;
    a drainage channel within and communicating with the reservoir, the drainage channel having a drainage inlet, located adjacent and spaced from the open top of the reservoir, and a drainage outlet, located adjacent the bottom wall of the reservoir, for facilitating drainage of excess fluid from the reservoir into a reservoir of an adjacent lower stackable unit;
    the reservoir having at least one lateral dispensing opening adjacent a bottom wall of the reservoir for dispensing fluid from the reservoir into growing medium, when accommodated by the at least one growing medium container of the stackable unit;
    the bottom wall of the reservoir being located at a height above a bottom of the at least one growing medium container; and
    the least one lateral dispensing opening supporting a capillary member which controls flow of fluid from the reservoir to the at least one growing medium container, for providing moisture thereto to facilitate growing of a plant, the fluid flowing substantially horizontally and radially through the capillary member.

2. The stackable unit according to claim 1, wherein the stackable unit defines a central axis and the drainage channel extends substantially parallel to the central axis of the stackable unit but is spaced radially therefrom.

3. The stackable unit according to claim 2, wherein the capillary member has a wall thickness of about between 0.0625 and 0.5 inches so as to facilitate an adequate fluid transfer rate, via the capillary member, such that growth medium contained within the at least one growing medium container is maintained sufficiently saturated.

4. The stackable unit according to claim 1, wherein each stackable unit includes at least two growth medium containers and each of the growth medium containers communicates with at least two dispensing openings to facilitate transfer of the fluid from the reservoir to the growth medium container.

5. The stackable unit according to claim 1, wherein the capillary member is a plug which fills the dispensing opening and facilitates the substantially horizontal and radial passage of fluid, via capillary action, from the reservoir to the growth medium container.

6. The stackable unit according to claim 1, wherein the capillary member is an elongate tubular member having first and second opposed ends, one end of the capillary tubular member communicates with a first one of the dispensing openings and the second end of the capillary tubular member communicates with a second dispensing opening, and an intermediate portion of the tubular member is accommodated within the growth medium container, the elongate tubular member extending substantially horizontally and radially from the first to the second dispensing opening.

7. The stackable unit according to claim 1, wherein the growth medium container is sized to accommodate a volume of growth medium of between about 500 and 5000 cubic inches, and the reservoir is sized to accommodate a volume of fluid of between 25 and 140 fluid ounces.

8. The stackable unit according to claim 1, wherein the stackable unit includes a plurality of growing medium containers, and the plurality of growing medium containers are arranged radially symmetrically about the reservoir.

9. The stackable unit according to claim 1, wherein an upper portion of the stackable unit is shaped to matingly engage with a lower portion of another stackable unit to facilitate nesting of at least two stackable units with one another in a nested array.

10. The stackable unit according to claim 1, wherein an upper portion of the stackable unit forms a male component which matingly engages with a female component of an adjacent lower stackable unit to facilitate nesting of at least two stackable units with one another in a nested array.

11. The stackable unit according to claim 1, wherein the stackable unit further includes an indexing structure for engaging immediately adjacent stackable units with one another such that the drainage channels of the immediately adjacent stackable units are prevented from being vertically aligned with one another.

12. The stackable unit according to claim 1, wherein the stackable unit includes a deflection plate associated with the drainage channel which forms a shield and deflects fluid flowing through the drainage channel.

13. A stackable unit for automatically dispensing fluid to at least one growing medium container associated with the stackable unit, the stackable unit comprising:
    at least one growing medium container;
    a reservoir having an open top to facilitate filling thereof and a bottom wall;
    a drainage channel within and communicating with the reservoir, the drainage channel having a drainage inlet, located adjacent and spaced from the open top of the reservoir, and a drainage outlet, located adjacent the bottom wall of the reservoir, for facilitating drainage of excess fluid from the reservoir;
    the reservoir having at least one lateral dispensing opening for dispensing fluid from the reservoir into growing medium, when accommodated by the at least one growing medium container of the stackable unit;
    a bottom wall of the reservoir being located at a height above a bottom of the at least one growing medium container; and the least one lateral dispensing opening supporting a capillary member which controls flow of fluid from the reservoir to the at least one growing medium container for providing moisture thereto to facilitate growing of a plant, wherein when a volume of fluid enters the reservoir of a top most stackable unit, the fluid will overflow through the drainage channel of the top most stackable unit and into the reservoir of an adjacent lower stackable unit.

14. A kit of parts comprising a plurality of stackable unit for automatically dispensing fluid to at least one growing medium container associated with the stackable unit, each of the plurality of stackable units comprising:

at least one growing medium container;

a reservoir having an open top to facilitate filling thereof and a bottom wall;

a drainage channel within and communicating with the reservoir, the drainage channel having a drainage inlet, located adjacent and spaced from the open top of the reservoir, and a drainage outlet, located adjacent the bottom wall of the reservoir, for facilitating drainage of excess fluid from the reservoir into a reservoir of an adjacent lower stackable unit;

the reservoir having at least one lateral dispensing opening, adjacent a bottom wall of the reservoir, for dispensing fluid from the reservoir into growing medium, when accommodated by the at least one growing medium container of the stackable unit the bottom wall of the reservoir being located at a height above a bottom of the at least one growing medium container; and the least one lateral dispensing opening supporting a capillary member which controls flow of fluid from the reservoir to the at least one growing medium container, for providing moisture to thereto to facilitate growing of a plant, the fluid flowing substantially horizontally and radially through the capillary member.

15. The kit of parts according to claim 14, wherein an upper portion of each of the plurality of stackable units is shaped to matingly engage with a lower portion of another one of the plurality of stackable units to facilitate nesting of the plurality of stackable units with one another in a nested array, and when the plurality of stackable units are nested with one another to form a nested array, any excess fluid flowing into the reservoir of a top most stackable unit of the nested array, will overflow through the drainage channel of the top most stackable unit and into the reservoir of an immediately adjacent lower stackable unit of the nested array.

16. The kit of parts according to claim 14, wherein each of the plurality of stackable units defines a central axis and each drainage channel extends substantially parallel to the central axis of the stackable unit but is spaced radially therefrom, and each of the plurality of stackable units includes at least two growth medium containers and each of the growth medium containers communicates with at least two dispensing openings to facilitate transfer of the fluid from the reservoir to the growth medium container.

17. The kit of parts according to claim 14, wherein each capillary member is a plug which fills the dispensing opening and facilitates the substantially horizontal and radial passage of fluid, via capillary action, from the reservoir to the growth medium container.

18. The kit of parts according to claim 14, wherein each capillary member is an elongate tubular member having first and second opposed ends, one end of the capillary tubular member communicates with a first one of the dispensing openings and the second end of the capillary tubular member communicates with a second dispensing opening, and an intermediate portion of the tubular member is accommodated within the growth medium container, the elongate tubular member extending substantially horizontally and radially from the first and second dispensing opening.

19. The kit of parts according to claim 14, wherein each growth medium container is sized to accommodate a volume of growth medium of between about 500 and 5000 cubic inches, each reservoir is sized to accommodate a volume of fluid of between 25 and 140 fluid ounces and each capillary member has a wall thickness of about between 0.0625 and 0.5 inches so as to facilitate an adequate fluid transfer rate, via the capillary member, such that growth medium contained within the at least one growing medium container is maintained sufficiently saturated.

20. A method of forming a nested array of a plurality of stackable units for automatically dispensing fluid to at least one growing medium container associated with the stackable unit, each stackable unit of the nested array comprising:

at least one growing medium container;

a reservoir having an open top to facilitate filling thereof and a bottom wall;

a drainage channel within and communicating with the reservoir, the drainage channel having a drainage inlet, located adjacent and spaced from the open top of the reservoir, and a drainage outlet, located adjacent the bottom wall of the reservoir, for facilitating drainage of excess fluid from the reservoir into a reservoir of an adjacent lower stackable unit;

the reservoir having at least one lateral dispensing opening for dispensing fluid from the reservoir into growing medium, when accommodated by the at least one growing medium container of the stackable unit;

a bottom wall of the reservoir being located at a height above a bottom of the at least one growing medium container; and the least one lateral dispensing opening supporting a capillary member which controls flow of fluid from the reservoir to the at least one growing medium container, for providing moisture to thereto to facilitate growing of a plant;

stacking the plurality of stackable units one on top of the other to form the nested array;

filling the reservoir of each of the plurality of stackable units in the nested array, by merely filling a top most reservoir, and allowing fluid to overflow from each reservoir into the drainage channel until each reservoir is filled.

* * * * *